United States Patent [19]

Bergh et al.

[11] Patent Number: 5,399,193
[45] Date of Patent: Mar. 21, 1995

[54] STARCH COMPOSITION

[75] Inventors: Niels-Olaf Bergh; Jan-Luiken Hemmes, both of Krefeld, Germany; Lars Olander, Värmdö, Sweden

[73] Assignee: Cerestar Holding B.V., Netherlands

[21] Appl. No.: 185,027

[22] Filed: Jan. 24, 1994

[30] Foreign Application Priority Data

Jan. 30, 1993 [GB] United Kingdom ............... 9301896

[51] Int. Cl.$^6$ ........................................... C09D 103/04
[52] U.S. Cl. ..................................... 106/211; 524/47
[58] Field of Search .......................... 106/211; 524/47

[56] References Cited

U.S. PATENT DOCUMENTS

Re. 261,50  12/1968  Mazzarella .
3,052,561   9/1962   Kronfeld .
3,320,080   9/1967   Mazzarella .
3,598,623   8/1971   Powers .
3,719,514   3/1973   Taylor .
3,953,421   4/1976   Berstein .
4,872,951   10/1989  Maliczysxyn .

FOREIGN PATENT DOCUMENTS 0350668  1/1990  European Pat. Off. .
1546416  7/1970  Germany .

OTHER PUBLICATIONS

Patent Abstracts of Japan vol. No. 280 (C-729) (4223) 1990778 Jun. 1990.

*Primary Examiner*—David Brunsman
*Attorney, Agent, or Firm*—Cushman Darby & Cushman

[57] ABSTRACT

The invention relates to a starch coating composition for use as a binder in coating colors and paper coating compositions using such colors. The composition comprises:

a) at least one of cationic starch and a cationic synthetic polymer in combination with a starch containing at least one non-ionic substituent or, b) a starch containing at least one non-ionic substituent.

18 Claims, No Drawings

STARCH COMPOSITION

The present invention relates to starch compositions, in particular to a starch composition for use as a binder in coating colours and to coating colours thereby produced. The invention also relates to paper coating processes using such coating colours.

The manufacture of paper customarily includes a process step in which the base paper is coated on one or both sides by pigment designed to change the appearance of the paper by improving its opacity and imparting a smooth and receptive surface for printing or for an additional coating step. The pigment coating is applied to the base paper in the form of a water-suspension, called a "coating colour", which contains as essential ingredients a pigment and binder. The suspension generally contains 35 to 70% total solids and after application the coating must be dried by removal of water from the film.

The pigment usually makes up 50 to 90% of the dry solids of the coating colour and has the function of forming on the paper surface a smooth, level, ink-receptive printing layer. To this end the pigment particles are of such a size that they can fill in the spaces between fibres on the paper surface and thereby form a more nearly uniform surface mat. Kaolin clays are widely used pigments as are talc, titanium dioxide and calcium carbonate, the choice of pigment being dictated by the properties required for the paper surface eg. high gloss, high dye receptivity and increased printability.

The function of the binder is to bind the pigment particles together and, in turn, the coating layer to the paper surface. The strength of the bond must be such that the coating layer is not detached ("picked") by tacky printing inks. The binder also has an influence on other properties of the coating layer and increasing quantities of binder can affect the brightness, gloss and printability of the latter. Usually, the amount of binder in coating colour is 5% to 25% by weight based on pigment but, exceptionally, higher amounts may be used. Commonly used binders include starches and certain synthetic polymers eg dispersions of styrene-butadiene or styrene-acrylate copolymers or polyvinyl alcohol. The present invention however is mainly directed at coating colours in which the binder is partly or entirely derived from starch.

Unmodified starches are not suitable as binders because when used in the concentration necessary for effective bonding the coating colour is too viscous. It is common practice therefore to use modified starches as binders. Modification may take place by acid, enzymatic or thermochemical treatment whereby the starch is degraded and its molecular weight is decreased. Alternatively, the starch may be oxidised eg. with hypochlorite which produces a product giving an aqueous solution which is clear and much more fluid at high concentration than is the parent starch. Substituted starches comprising, for example, a hydroxyethyl substituent may also be used and have the advantage that the presence of the substituent inhibits the undesirable gelling or retrogradation of the starch when its hot aqueous solution is cooled.

Various methods are available for applying the coating colour to the paper surface differing mainly in the means adopted for metering the coating onto the surface so as to obtain a controlled and even coating thickness. In the "film-press" method of application the paper is fed through the nip between two cooperating feed rollers, coating colour applied to one or both rollers being transferred to one or both sides of the paper under pressure so as to effect a compressed coating on one or both surfaces of the paper as desired. The thickness of the coating colour layer on the feed roller(s) is important since it controls the thickness of the layer applied to the paper. The "pre-dosing" of the coating colour onto the feed roller may be achieved by feeding the colour into the nip between the roller and an adjacent bent blade or rotating smooth rod. The hydrodynamic pressure which is generated in the nip between the roller and blade or smooth rod forces the coating colour through the nip onto the feed roller and, in general, the higher the hydrodynamic pressure the thicker the coating applied to the feed roller.

The hydrodynamic pressure developed in the coating colour is dependant inter alia upon the solids content of the coating colour and the viscosity of the latter at the time of application. The two pre-dosing methods described above require different hydrodynamic pressures and, it is preferred to have a higher hydrodynamic pressure when the coating colour is applied by a smooth rod than it is when using a bent blade. We have now found that to provide a starch-based binder having the desired rheology for film-press coating in general and for smooth rod pre-dosing in particular it is advantageous to use a combination of modified starches or a combination of a modified starch and a synthetic polymer or to use a single starch in which the starch has been modified in two different ways.

Accordingly, the invention comprises a composition which is useful as a binder in coating colours and which is characterised by the presence of (a) a cationic starch and/or a cationic synthetic polymer in combination with a starch containing at least one non-ionic substituent or, (b) a cationic starch containing at least one non-ionic substituent.

U.S. Pat. No. 3,598,623 describes the use of carboxyl starch amine ethers as binders for paper coating colours. Such starches contain both an anionic group and a cationic group and may be made by cationising an oxidised starch whereby a tertiary amine or quaternary ammonium group is introduced into a starch already containing a carboxyl group. We have found however that the COD (chemical oxygen demand) is higher for starch ethers of the U.S. patent than for the compositions of the present invention, which is an important factor in the paper industry with respect to effluent disposal. In addition, we have found that physical mixtures of a cationic starch and an oxidised starch are, unlike the compositions of the present invention, unstable after gelatinisation.

The cationic synthetic polymer may be a low molecular weight highly substituted synthetic polymer with high charge density eg polyethyleneimine, but preferably the cationic component is a cationic starch, more preferably a cationic starch in which the cationic substituent is a tertiary amino or quaternary ammonium group, particularly the latter eg. the product obtained by reacting maize, waxy-maize, tapioca, wheat, barley or potato starch with the chorhydrin, 3-chloro-2-(hydroxypropyl)-trialkyl ammonium chloride or its epoxide equivalent. "Alkyl" in the latter compound is suitably methyl, ethyl or propyl.

Preferably the non-ionic substituent in the compositions according to the present invention is an ester group as in a starch ester or a hydroxyalkyl group as in a hydroxyalkyl-substituted starch. Suitable starch esters for use in the composition according to the invention are short chain ($C_1$ to $C_4$) alkyl esters eg. starch acetate or starch propionate, particularly the former. A hydroxyalkyl substituted starch for use in the composition is preferably hydroxyethyl or hydroxypropyl starch, especially the latter. The cationic starch and the starch containing a non-ionic substituent are suitably the subject of a mild degradation treatment eg with acid, enzyme or thermally either before the starch is modified or, if after modification, either before or after the composition is prepared. Preferably, the degradation is achieved thermally in the presence of a thermochemical conversion agent such as potassium persulphate.

It is also possible to obtain the objects of the invention by combining the cationic function and the non-ionic function in the one and the same starch molecule by means of a double modification of the starch eg by cationising a starch containing a non-ionic, eg hydroxypropyl substituent.

The preferred weight ratio of cationic starch to the starch containing a non-ionic substituent is 10 to 60:90 to 40 preferably 30 to 50:70 to 50. The preferred composition is 30 to 50 parts by weight of a cationic starch which is the product of reacting 3-chloro-2(hydroxypropyl)- trimethyl ammonium chloride with maize or potato starch together with 70 to 50 parts by weight hydroxypropyl starch (maize or wheat)

The invention also comprises a coating colour which comprises an aqueous suspension of one or more pigments and a binder as hereinbefore described. The coating colour preferably comprises 1 to 50 pans by weight, more preferably 10 to 25 parts, by weight, binder per 100 parts By weight pigment. The mixture may also contain other additives eg latex suitably in an amount 1 to 50 parts by weight per 100 parts by weight pigment preferably 1 to 10 parts by weight.

The invention also comprises a process for applying a coating colour to a paper base by a film-press method in which the coating colour is that described above. The coating colour preferably contains 25 to 75% by weight solids, more preferably about 50% by weight solids.

The invention will now be further illustrated by reference to the following Examples.

EXAMPLES

A number of coating colour formulations were prepared by blending cooked starch dispersions containing 20 to 22% by weight solids and a predispersed pigment slurry containing 75% by weight solids.

The starch dispersions were in turn prepared by heating a slurry of the relevant starches in a continuous cooker at 130° to 140° C. in the presence of varying amounts of a thermochemical conversion agent, SP26, a commercially available blend of potassium persulphate and buffering chemicals.

The coating colour formulations contained 15 parts by weight total starch and 5 parts by weight latex calculated as dry product on 100 parts by weight dry pigment Hydrocarb 70 (a calcium carbonate ie. chalk coating pigment)

The coating colour formulations were evaluated in a pilot scale film-press coater provided with a smooth rod as the predosing means. The rod was operated at a constant pressure of $1 \times 10^5$ Pa and the quantity of the composition deposited on the woodfree coating base paper was determined gravimetrically by means of a doctor knife of specified width being applied to the film-press roll, the coating which was scraped off in a set period of time being weighed.

The followed Table contains the compositions of the various formulations tested and the relationship between the Brookfield viscosities of the formulations (measured at 30° C. and 100 rpm) and the weight of the coating applied to the paper roll.

| Starch Components | Amount of SP26 | Starch + Viscosity | D.S. of Coating** Colour Composition | Viscosity of + + Coating Colour Composition | Coating + + wt (g) |
| --- | --- | --- | --- | --- | --- |
| A* | 0.80 | 250 | 52 | 280 | 2.0 |
| A | 0.65 | 400 | 52.4 | 460 | 6.5 |
| A | 0.50 | 1500 | 52.4 | 500 | 5.0 |
| 50% A + 50% B | 0.55 | 300 | 52.6 | 1260 | 9.0 |
| 50% A + 50% B* | 0.35 | 390 | 51.9 | 980 | 7.0 |
| 50% A + 50% B | 0.20 | 1100 | 50.2 | 2440 | 12.0 |
| 70% A + 30% B | 0.70 | 220 | 52.7 | 660 | 10.5 |
| 70% A + 30% B | 0.62 | 380 | 52.0 | 660 | 8.0 |
| 70% A + 30% B | 0.55 | 800 | 52.1 | 1280 | 12.5 |
| A | 0.8 | 250 | 48.6 | 156 | 5.0 |
| A | 0.65 | 400 | 48.7 | 180 | 6.0 |
| A | 0.5 | 1500 | 48.3 | 200 | 2.5 |
| 50% A + 50% B | 0.55 | 300 | 48.3 | 580 | 8.5 |
| 50% A + 50% B | 0.35 | 390 | 48.7 | 675 | 7.0 |
| 50% A + 50% B | 0.20 | 1100 | 48.7 | 1840 | 11.5 |
| 70% A + 30% B | 0.70 | 220 | 48.2 | 460 | 6.5 |
| 70% A + 30% B | 0.55 | 800 | 48.6 | 720 | 8.0 |
| A | 0.50 | 1500 | 56.8 | 960 | 5.0 |

*Starch A was a propoxylated maize starch
*Starch B was a cationic maize starch (cationisation reagent N-(3-chloro-2-hydroxypropyl)-N,N,N-trimethyl ammonium chloride)
**D.S. = dissolved solids
+ viscosity of 25% solids at 50° C.
+ + preferred coating weight 10 grams

We claim:
1. A composition which is useful as a binder in coating colors which comprises:
 (a) at least one member of the group consisting of cationic starch and a cationic synthetic polymer in combination with a starch containing at least one non-ionic substituent, or
 (b) a cationic starch containing at least one non-ionic substituent.

2. A composition as set forth in claim 1 in which the cationic component is a low molecular weight, highly substituted polymer.

3. A composition as set forth in claim 2 in which the cationic component is a member of the group consisting of polyethyleneimine and cationic starch in which the cationic substituent is a tertiary or quaternary ammonium group.

4. A composition as set forth in claim 3 in which the cationic starch is the product obtained by reacting a member of the group consisting of maize starch, waxy maize starch, tapioca starch, whet starch, barley starch and potato starch with a 3-chloro-2-(hydroxypropyl)-trialkyl ammonium chloride.

5. A composition as set forth in claim 1 in which the non-ionic substituent contains an ester group.

6. A composition as set forth in claim 5 in which the non-ionic substituent is a $C_1$–$C_4$ alkyl ester or a hydroxyalkyl group.

7. A composition as set froth in claim 6 in which the non-ionic substituent is an acetate group.

8. A composition as set forth in claim 6 in which the non-ionic substituent is a hydroxyethyl or hydroxypropyl group.

9. A composition as set forth in claim 1 in which the cationic starch has been subjected to a mild degradation treatment.

10. A composition as set forth in claim 1 in which the starch containing a non-ionic substituent has been subjected to a mild degradation treatment.

11. A composition as set forth in claim 9 or claim 10 in which the mild degradation treatment is carried out thermally in the presence of a thermochemical conversion agent, an acid or an enzyme.

12. A composition as set forth in claim 1 in which the composition contains both a cationic starch and a starch containing a non-ionic substituent, and they are present in a weight ratio of cationic starch to starch containing a non-ionic substituent in the range 10 to 60:90 to 40.

13. A composition as set forth in claim 12 in which the ratio is in the range 30 to 50:70 to 50.

14. A composition as set forth in claim 1 which comprises 70 to 50 parts by weight hydroxypropyl starch together with 30 to 50 parts of a cationic starch which is the product of reacting a member of the group consisting of maize starch and potato starch with 3-chloro-2-(hydroxypropyl)-trimethl ammonium chloride or its epoxide equivalent.

15. A color coating composition which comprises an aqueous suspension of at least one pigment and a binder comprising a composition as set forth in claim 1.

16. A composition as set forth in claim 15 in which there are 1 to 50 parts by weight binder per 100 parts by weight of pigment.

17. A composition as set forth in claim 16 in which there are 1 to 10 parts by weight of binder per 100 parts by weight of pigment.

18. A process which comprises applying a coating color to a paper by a film-press method, the coating color being a composition as set forth in any one of claims 15–27.

* * * * *